United States Patent [19]

Dworsky et al.

[11] 4,446,432

[45] May 1, 1984

[54] METHOD FOR DETERMINING SURFACE CONTOUR OF PIEZOELECTRIC WAFERS

[75] Inventors: Lawrence N. Dworsky, Northbrook; Garth R. Kennedy, Hinsdale, both of Ill.

[73] Assignee: Motorola Inc., Schaumburg, Ill.

[21] Appl. No.: 382,425

[22] Filed: May 27, 1982

[51] Int. Cl.³ .......................................... G01N 27/00
[52] U.S. Cl. .................................. 324/71.5; 324/71.1
[58] Field of Search ..................... 324/61 P, 71.5, 71.1

[56] References Cited

U.S. PATENT DOCUMENTS

| | | | |
|---|---|---|---|
| 4,103,226 | 7/1978 | Fromson | 324/61 P |
| 4,112,355 | 9/1978 | Gibson | 324/61 R |
| 4,168,465 | 9/1979 | Prince | 324/61 P |
| 4,182,981 | 1/1980 | Shum | 324/61 R |
| 4,311,959 | 1/1982 | Riessland | 324/61 P |

OTHER PUBLICATIONS

T. Shiosaki et al., "Application of Surface Wave to the Study of Semiconductor Surface State Using the Separated-Medium Acoustoelectric Effect," Applied Physics Letters, vol. 26, No. 7, pp. 360-362, Apr. 1, 1974.

Primary Examiner—Michael J. Tokar
Attorney, Agent, or Firm—James W. Gillman; Donald B. Southard; Edward M. Roney

[57] ABSTRACT

A method utilizing a localized electrical field to precisely determine the surface contour of a substantially flat wafer of piezoelectric material having a slight convexity in its opposing faces.

2 Claims, 6 Drawing Figures

METHOD FOR DETERMINING SURFACE CONTOUR OF PIEZOELECTRIC WAFERS

BACKGROUND OF THE INVENTION

This invention relates generally to the determination of physical parameters of piezoelectric resonators and, more particularly, to a method for determining the surface contour of substantially flat piezoelectric wafers.

Piezoelectric resonators are used for frequency control and selection in many applications, such as in monolithic filters for VHF radio apparatus. Filters of this type comprise a substantially flat piezoelectric wafer having an array of pairs of thin film electrodes deposited on the opposing faces of the wafer. The frequency response of the filters is principally dependent upon the geometry of the wafer, although it is also affected by the electrode shape, thickness, mass and alignment.

Currently, the manufacture of piezoelectric resonators typically includes a fine tuning step in which electrode mass is adjusted while resonator frequencies are monitored. Deviation in electrode dimensions, alignment of electrode pairs, electrode mass, and crystal angle as well as minor variations in wafer thickness may be compensated in this way, so long as the effects of variation in the wafer thickness are small compared to the effects of the variations in all of the other parameters.

However, it is becoming increasingly difficult to meet the very strict tolerances called for in many state of the art applications utilizing high frequency, high overtone resonators and multi-resonators. Also, with respect to the multi-resonator devices, in particular, there is a special need for a method for precisely determining the surface contour or thickness profile of the piezoelectric wafer in order to predict the relative frequencies of the resonators on the wafer.

Traditionally, piezoelectric wafer thicknesses have been determined by optical interference fringe techniques, which yield approximate thickness figures not useful for precise thickness determinations. Somewhat greater accuracy can be obtained using a more recent electrical technique in which the wafers are disposed between the electrodes of an air dielectric capacitor and the input impedance seen by this capacitor is measured. Since the resonant frequencies of the wafer vary inversely with the plate thickness, resonances observed at the capacitor terminals, using appropriate impedance matching circuits, are correlated to the plate thickness. However, average, rather than a localized, thickness figure is obtained. Since the opposing faces of the wafer typically are not absolutely parallel but have a slight convexity, these thickness figures are related to the maximum thickness of the wafer, and are not helpful in predicting the localized thicknesses of the wafer, as required in high precision applications.

SUMMARY OF THE INVENTION

The method of the present invention permits a precise determination of the surface contour of a substantially flat wafer of piezoelectric material having a slight convexity in its opposing faces by measuring the response of the wafer in a plurality of locations.

An apparatus which could be used in the practice of the method of the present invention includes a base for supporting the wafer and means for coupling the wafer to ground. It also includes probe means for applying a localized electrical field to a plurality of loctions on one face of the wafer and means for measuring the response of the wafer at each of these locations.

The method of the present invention utilizes an apparatus for the above type in determining the location of the maximum thicknes of the wafer, which does not necessarily correspond to its geometric center, and in obtaining the maximum thickness, $2h_o$, and the radius of curvature, $R$, of the wafer. The method entails:

(1) Applying a localized electrical field to the wafer to excite an arbitrary location on its face while monitoring the frequency response to determine the Oth order frequency of the wafer.

(2) Traversing the face of the wafer with the localized electrical field while monitoring the amplitude of the response of the wafer at the Oth order frequency until the location of maximum amplitude is found. This location corresponds to the point of maximum thickness of the wafer.

(3) Moving the localized electrical field from the location of maximum thickness along one of the planar axes of the wafer until an amplitude peak for the next mode is obtained and measuring the distance traversed, $a$.

(4) Solving the following equation for $\beta$:

$$0 = \frac{d}{da}[(e^{-\beta a^2/2})(2\beta^{\frac{1}{2}}a)],$$

and using the value obtained for $\beta$ to solve one of the following equations for R:

$$\beta_N{}^2 = \frac{N^2\pi^2\bar{C}_{66}}{8Rh_o{}^3C_{55}}, \text{ if the field is moved along the } z \text{ axis, or}$$

$$\beta_N{}^2 = \frac{N^2\pi^2\bar{C}_{66}}{8Rh_o{}^3C_{11}}, \text{ if the field is moved along the } x \text{ axis,}$$

where N is the mode along the y thickness axis, $\bar{C}_{66}=C_{66}+e_{26}{}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the thickness direction of the wafer, and $C_{11}$, $C_{55}$ are elastic coefficients of the piezoelectric material; and (5) Solving the following equation for $2h_o$, by substituting the value obtained for R:

$$\omega^2_{N,M,P} = \left(\frac{N\pi}{2h_o}\right)^2 \frac{\bar{C}_{66}}{\rho} \left\{ 1 + \frac{1}{N\pi}\left(\frac{2h_o}{R}\right)^{\frac{1}{2}}\left[\left(\frac{C_{11}}{\bar{C}_{66}}\right)^{\frac{1}{2}}(2M+1) + \left(\frac{C_{55}}{\bar{C}_{66}}\right)^{\frac{1}{2}}(2P+1)\right]\right\}$$

where $\omega$ is the resonant frequency in radians for the Nth y thickness axis overtone, the Mth planar x axis overtone and the Pth planar z axis overtone, $\bar{C}_{66}=C_{66}+e_{26}{}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the y direction of the wafer, and $C_{11}$ and $C_{55}$ are elastic coefficients of the piezoelectric material.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several figures and in which:

DETAILED DESCRIPTION OF A PREFERRED EMBODIMENT

Figure 1:
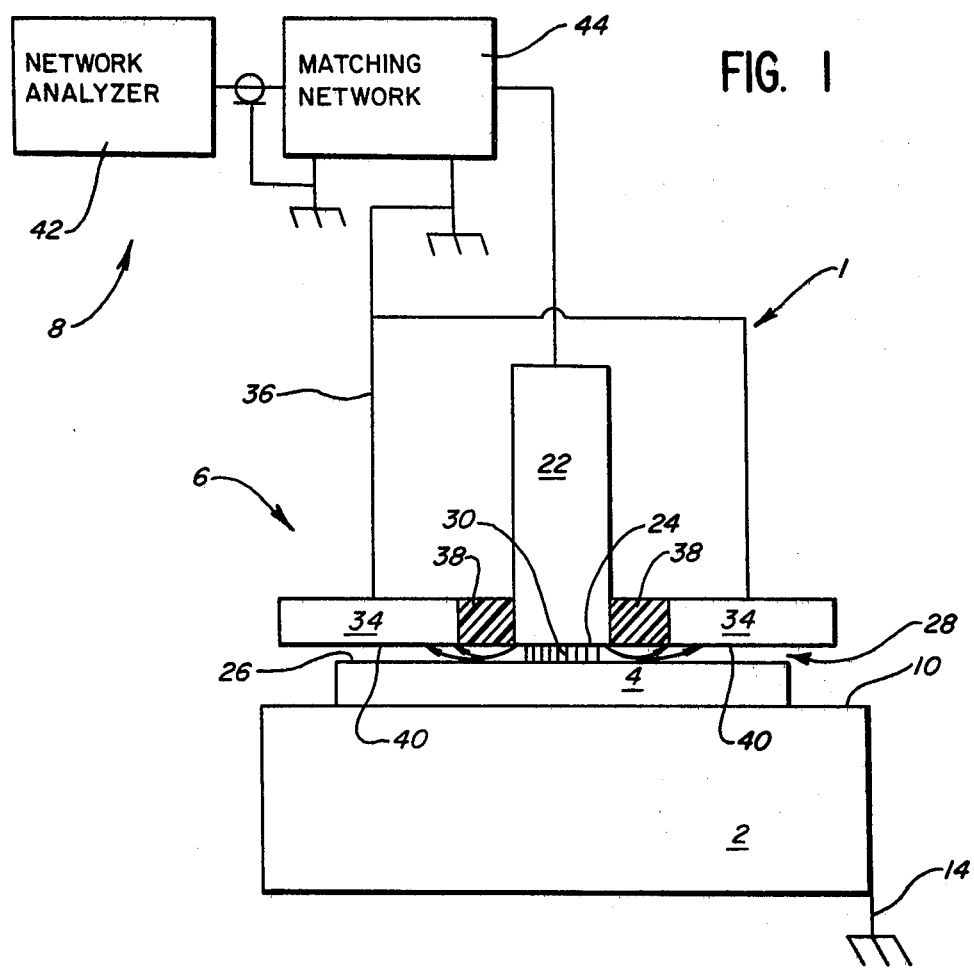
FIG. 1 is a schematic cross-sectional view of an apparatus according to the teaching of the present invention.

FIG. 1 illustrates an apparatus 1 which can be used in the practice of the present invention including a base 2 supporting a wafer of piezoelectric material in the form of an AT Cut quartz plate 4, probe means 6 and means for measuring the response of the quartz plate, 8.

Base 2, which is made of an electrically conductive material such as aluminum, has a flat bearing surface 10 for supporting the quartz plate. Flat bearing surface 10 has three evenly spaced projections 12 for positioning and confining the wafer on the base.

The base should be thick enough to prevent it from flexing or becoming distorted over time and to lend it sufficient mass to prevent it and the quartz plate which it supports from moving during operation of the overall apparatus. Preferably, flat bearing surface 10 of the base should be large enough to extend beyond the edges of the quartz plate. In this embodiment, the quartz plate is a disc of from 200–500 mils in diameter and the flat bearing surface is sufficiently large to extend at least 100 mils beyond the edge of the plate. Finally, base 10 includes means for coupling the quartz plate to ground through the physical contact of the plate resting upon the conductive base and an electrical conductor 14 coupling the base to ground.

Figure 2:
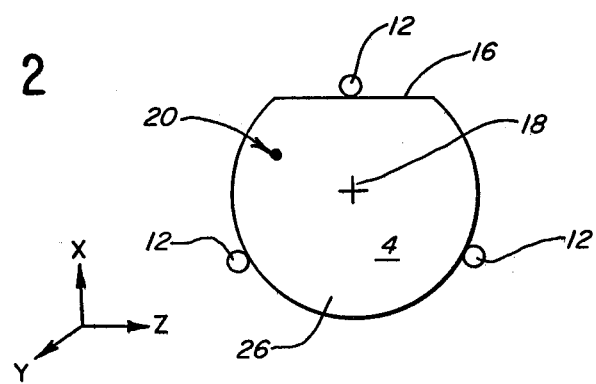
FIG. 2 is a plan view of a quartz plate examined with the apparatus of FIG. 1.

Turning to FIG. 2, quartz plate 4 is shown in the form of a disc confined within projections 12 and having a flat 16 which identifies the x and z planar axes of the plate. The remaining y axis is therefore the thickness axis of the plate. The geometric center of the plate, 18, and its thickest point, 20, are non-coincident points.

The quartz plate of FIG. 2 is AT cut to 2-8 mils in thickness. However, the apparatus and method of the present invention could be used with quartz and other piezoelectric plates of various cuts, geometric shapes and thicknesses.

Returning to FIG. 1, probe means 6 is illustrated as including an electrode 22 having a forward end 24 much smaller than the face 26 of the quartz plate. The lateral dimensions of the forward end are dictated by the competing concerns of signal/noise resolution, which can be enhanced by enlarging the lateral dimensions of the forward end, and a desire for the best possible spatial resolution, which calls for minimal forward end lateral dimensions. In the embodiment illustrated in FIG. 1, electrode 22, a solid cylinder of an electrically conductive material such as aluminum, is 40 mils in diameter, making forward end 24 a circle of 40 mils diameter.

Electrode 22 is laterally movably supported above the base with its forward end 24 adjacent flat bearing surface 10 at a spacing sufficient to permit the quartz plate to be placed therebetween without physical contact between the electrode and face 26 of the quartz plate. Of course, the same result could be achieved in an alternate embodiment in which the base is movable and the electrode is fixed.

The air gap 28 formed between the probe forward end and the face of the quartz plate should be made as small as practically possible in order to maximize the signal produced in the quartz plate. The forward end of the probe must not, however, be permitted to touch the quartz plate, since if it were to do so, the frequency characteristics of the plate would be altered and the plate itself might be damaged. Gap 20, which is greatly exaggerated in FIG. 1, is about one mil in the present embodiment.

Figure 3A:
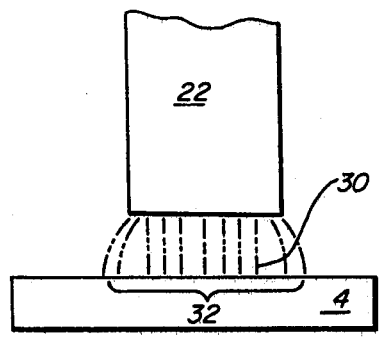
FIGS. 3a and 3b are exploded sectional views of an unshielded electrode, showing varying areas of excitation.
Figure 3B:
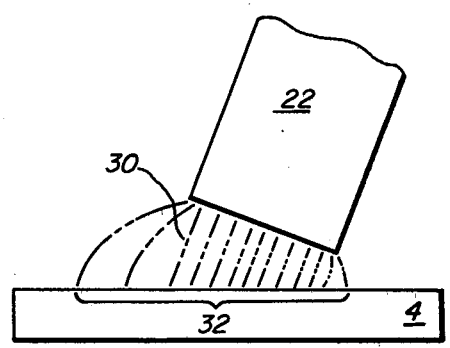

Since the apparatus of the present invention is intended to apply a localized electrical field to arbitrary locations on the face of the quartz plate, it is essential that the electrical field pattern 30 be well defined with the field lines impinging on the quartz being essentially vertical at incidence. Otherwise, even microscopic camber and pitch in the electrode as it traverses the face of the crystal will vary the effective area of the excitation of the crystal 32, as illustrated in the exaggerated partial views of FIGS. 3a and 3b, producing inconsistent data. Also, elimination of field fringing reduces the tendency for field lines to "leak around" the edge of the quartz plate and confuse measurements, as the electrode approaches the edge of the plate.

The desired well defined electrical field pattern is obtained in the present apparatus by eliminating electric field fringing with shielding means in the form of guard 34 which surrounds the electrode. Guard 34 is made of an electrically conductive material such as aluminum and is coupled to ground by a conductor 36. In practice, it has been found that conductor 36 as well as conductor 14, which couples the base to ground, should be as short as possible in order to minimize noise in the apparatus. Also, in some applications conductor 14 may be eliminated altogether and the required grounding achieved through the shielding means.

Guard 34 is evenly spaced from electrode 22 and electrically insulated from it by a dielectric sleeve 38 which may be made from a non-conductive material such as polytetrafluoroethylene, sold under the DuPont de Nemours' trademark, Teflon. The spacing between the electrode and the sleeve should be made as small as possible to eliminate the maximum amount of electrical field fringing, but not so small as to permit shorting between the electrode and the guard. In the embodiment illustrated in FIG. 1, the spacing is about 10–15 mils.

It is most preferable that the forward edge 40 of the guard be substantially coplanar with front end 24 of the electrode, in order to maximize the elimination of electrical field fringing and the signal produced by the probe. If the guard forward edge were set back from the forward end of the electrode, the effective distance between the electrode forward end and the guard would be increased, thereby decreasing the fringing removal. If, on the other hand, the forward edge of the guard were positioned below the forward end of the electrode, gap 28 would have to be increased to prevent physical contact with face 26 of the quartz plate, thereby reducing the strength of the signal produced by the probe.

Figure 4:
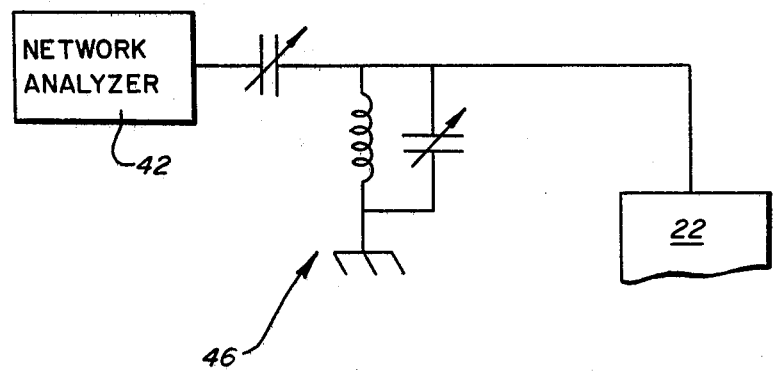
FIG. 4 is a schematic diagram of a Matching Network which may be used in the apparatus of the present invention.

A Network Analyzer 42 such as a Hewlett Packard HP8505 in combination with a Matching Network 44 supplies current to electrode 22 in order to produce an electrical field in the form of electrical field pattern 30, and to measure the response of the quartz plate at each location at which the electrical field is applied. The Matching Network is utilized to interface the Network Analyzer and the electrode by adjusting the impedance seen at the electrode to the optimal working impedance level of the Network Analyzer, which in the case of the HP8505 is 50 ohms. A typical tunable Matching Network circuit 46 is illustrated in FIG. 4. This circuit should be slightly off tuned in order to avoid a perfect impedance match which would limit operation of the Network Analyzer to an unacceptably narrow bandwidth.

In practice, electrode 22 and shielding means 34 are transported in a plane substantially parallel to the face of the wafer thereby maintaining a uniform gap 28 between the electrode forward end and the face of the wafer, while the narrow, well defined electric field pattern 30 produced at forward end 24 of the electrode impinges upon the face of the quartz plate. The response of the plate is monitored by the Network Analyzer which can display the magnitude of the response as a function of frequency on an oscilloscope screen and/or can provide this information to a computer for processing, in a manner which will be discussed below.

While it might be expected that a simple relationship between a particular location on the plate and the resonance excited at that point would exist, permitting a simple calculation of the thickness profile of the plate, this was found not to be the case. Instead, it was found that multiple resonances were excited at all locations, with no obvious relationship between a particular location on the plate and the particular resonances excited. The resonant modes (and frequencies) were thus determined by the plate itself, and not by the location of the probe, which appeared to excite the entire plate, notwithstanding the application of the electrical field at one localized point.

A mathematical model was developed to explain this result, and is set forth in a publicly available engineering bulletin of Motorola, Inc., CORRELATIONS, Winter 1981, p.9, "Analysis of Air-Gap Probe Frequency Measurements of AT-Cut Crystal Plates" by Larry Dworsky, and in the PROCEEDINGS OF THE THIRTY-FIFTH ANNUAL SYMPOSIUM ON FREQUENCY CONTROL 1981, 27-29 May 1981, sponsored by the U.S. Army Electronics Research and Development Command, and available from Electronic Industries Association, 2001 Eye Street, N.W., Washington, D.C., p.237, "Air-Gap Probe Evaluation of Thin Quartz Plates" by Dworsky and Kennedy.

Figure 5:
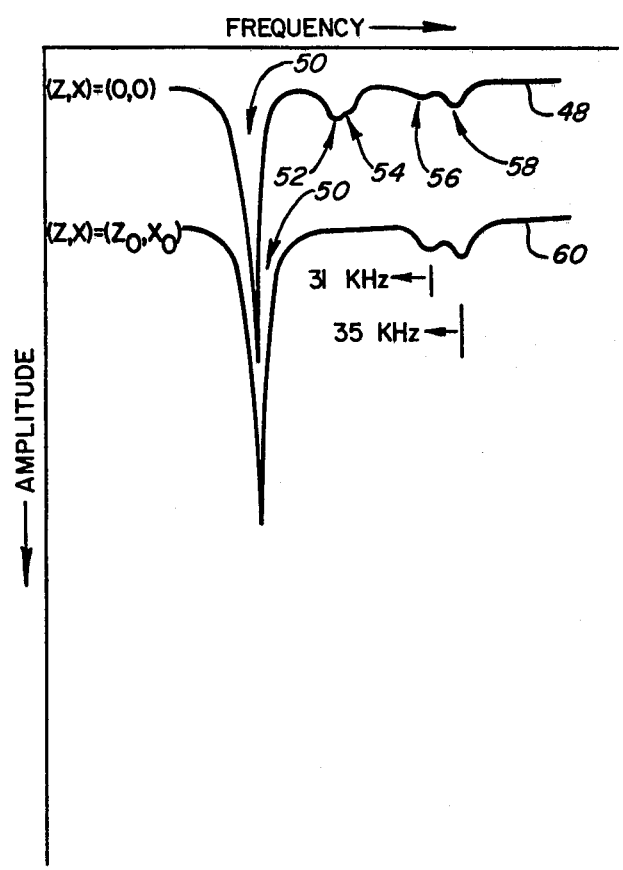
FIG. 5 is a collection of oscillographs of amplitude versus frequency for a number of arbitrary wafer locations, including the point of maximum wafer thickness.

In this model it is assumed that the surface contour of the piezoelectric material may be completely characterized in terms of the location and value of its maximum thickness, $2h_o$, and its radius of curvature, R. The location of the point of maximum thickness of the plate, $2h_o$, is determined in two steps. First, at an arbitrary point on the plate the 0th order or lowest frequency of the plate is established by monitoring the Network Analyzer, either directly by observing the oscilloscope of the analyzer, or, automatically, by computer. Oscillograph 48 of FIG. 5 shows the desired 0th order peak 50 as it would appear on the oscilloscope of the Network Analyzer, along with higher order peaks 52 and 54 ((0,1) and (1,0)) and 56 and 58 ((0,2 and (2,0)). This particular oscillograph is taken at the geometric center of the quartz plate, (0,0), although in general it will be taken at an arbitrary location.

Once the 0th order frequency is determined, the face of the quartz plate is traversed with the probe while the response of the 0th order frequency is monitored at the Network Analyzer, again either by observing the oscilloscope or automatically by computer, until the location of maximum amplitude of the 0th order frequency is found, as indicated in oscillograph 60 of FIG. 5. This location corresponds to the point of maximum thickness, $2h_o$.

Once the point of maximum thickness is thus established, the values of R and $2h_o$ can be obtained. In order to do this, the localized electrical field is moved from the location of maximum thickness along one of the planar axes of the wafer until an amplitude peak for the next mode is obtained, the distance traversed, a, is measured, and the following equation is solved for $\beta$:

$$0 = \frac{d}{da} [(e^{-\beta a^2/2})(2\beta^{\frac{1}{2}}a)],$$

and using the value obtained for $\beta$ to solve one of the following equations for R:

$$\beta_N{}^2 = \frac{N^2\pi^2 \overline{C}_{66}}{8Rh_o{}^3 C_{55}}, \text{ if the field is moved along the } z \text{ axis, or}$$

$$\beta_N{}^2 = \frac{N^2\pi^2 \overline{C}_{66}}{8Rh_o{}^3 C_{11}}, \text{ if the field is moved along the } x \text{ axis,}$$

where N is the mode along the y thickness axis, $\overline{C}_{66} = C_{66} + e_{26}{}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the thickness direction of the wafer, and $C_{11}$, $C_{55}$ are elastic coefficients of the piezoelectric material. The value obtained for R may then be substituted in the following formula to obtain $2h_o$:

$$\omega^2_{N,M,P} = \left(\frac{N\pi}{2h_o}\right)^2 \frac{\overline{C}_{66}}{\rho} \left\{ 1 + \frac{1}{N\pi}\left(\frac{2h_o}{R}\right)^{\frac{1}{2}} \left[ \left(\frac{C_{11}}{\overline{C}_{66}}\right)^{\frac{1}{2}}(2M+1) + \left(\frac{C_{55}}{\overline{C}_{66}}\right)^{\frac{1}{2}}(2P+1) \right] \right\}$$

where $\omega$ is the resonant frequency in radians for the Nth y thickness axis overtone, the Mth planar x axis overtone and the Pth planar z axis overtone, $\overline{C}_{66} = C_{66} + e_{26}{}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the y direction of the wafer, and $C_{11}$ and $C_{55}$ are elastic coefficients of the piezoelectric material. $C_{11}$ may be further corrected in the formulas for $\omega^2$ and $\beta^2$ for a small mechanical coupling effect, as explained in H. F. Tiersten, "Analysis of Intermodulation in Thickness-Shear and Trapped Energy Resonators", J. Acoustic Soc. Am., Vol. 57, #3, March 1975. This correction as well as all of the piezoelectric constants and elastic coefficients may be obtained from standard reference works familiar to those skilled in the art, including *Linear Piezoelectric Plate Vibrations*, by H. Tiersten, 1969, Plenum Press at pp. 59–60.

The values thus obtained for $2h_o$ and R taken with the location of $2h_o$ fully characterize the surface contour of the convex quartz plate, permitting the prediction of the motional parameters of a given electrode configuration and, in the case of a monolithic filter, the resonant frequencies of the resonators as well as the inter-resonator coupling.

It will be understood that the invention may be embodied in other specific forms without departing from the spirit or central characteristics thereof. The present embodiments are to be considered as being illustrative and not as being restrictive, and the invention is not to be limited to the details herein but may be modified within the scope of the appended claims.

What is claimed is:

1. A method of determining the radius of curvature, R, of the surface contour of a convex wafer of piezoelectric material, comprising:

applying a localized electrical field to an arbitrary location on a face of the wafer while monitoring the frequency response to determine the 0th order frequency of the wafer;

traversing the face of the wafer with said localized electrical field while monitoring the amplitude of the response at said 0th frequency until the location of maximum amplitude is found, said location corresponding to the point of maximum thickness, $2h_o$, of said wafer;

moving said localized electrical field from said location of maximum thickness along one of the planar axes of the wafer until an amplitude peak for the next mode is obtained, measuring the distance traversed, a, and solving the following equation for $\beta$:

$$0 = \frac{d}{da}[(e^{-\beta a^2/2})(2\beta^{\frac{1}{2}}a)],$$

and using the value obtained for $\beta$ to solve one of the following equations for R:

$$\beta_N^2 = \frac{N^2\pi^2 \overline{C}_{66}}{8Rh_o^3 C_{55}}, \text{ if the field is moved along the } z \text{ axis, or}$$

$$\beta_N^2 = \frac{N^2\pi^2 \overline{C}_{66}}{8Rh_o^3 C_{11}}, \text{ if the field is moved along the } x \text{ axis,}$$

where N is the mode along the y thickness axis, $\overline{C}_{66} = C_{66} + e_{26}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the thickness direction of the wafer, and $C_{11}$, $C_{55}$ are elastic coefficients of the piezoelectric material.

2. The method of claim 1 wherein the maximum thickness, $2h_o$, of the wafer is determined solving the equation:

$$\omega_{N,M,P}^2 = \left(\frac{N\pi}{2h_o}\right)^2 \frac{\overline{C}_{66}}{\rho}\left\{1 + \frac{1}{N\pi}\left(\frac{2h_o}{R}\right)^{\frac{1}{2}}\left[\left(\frac{C_{11}}{\overline{C}_{66}}\right)^{\frac{1}{2}}(2M+1) + \left(\frac{C_{55}}{\overline{C}_{66}}\right)^{\frac{1}{2}}(2P+1)\right]\right\}$$

where $\omega$ is the resonant frequency in radians for the Nth y axis overtone, the Mth x axis overtone and the Pth z axis overtone, $\overline{C}_{66} = C_{66} + e_{26}^2/\epsilon_{22}$ where $C_{66}$ is an elastic coefficient of the piezoelectric material, $e_{26}$ is a piezoelectric coupling coefficient and $\epsilon_{22}$ is a dielectric constant of the piezoelectric material in the thickness direction of the wafer, and $C_{11}$ and $C_{55}$ are elastic coefficients of the piezoelectric material.

* * * * *